US008165276B2

(12) United States Patent
Gunderman, Jr.

(10) Patent No.: US 8,165,276 B2
(45) Date of Patent: Apr. 24, 2012

(54) SYSTEM AND METHOD FOR AUDITING A COMMUNICATIONS BILL

(75) Inventor: Robert Dale Gunderman, Jr., Honeoye Falls, NY (US)

(73) Assignee: Intellectual Ventures Holding 86 LLC, Dover, DE (US)

( * ) Notice: Subject to any disclaimer, the term of this patent is extended or adjusted under 35 U.S.C. 154(b) by 265 days.

(21) Appl. No.: 12/254,004

(22) Filed: Oct. 19, 2008

(65) Prior Publication Data

US 2009/0055297 A1    Feb. 26, 2009

Related U.S. Application Data

(63) Continuation of application No. 10/911,876, filed on Aug. 5, 2004, now Pat. No. 7,440,557.

(60) Provisional application No. 60/493,752, filed on Aug. 8, 2003.

(51) Int. Cl.
*H04M 15/00* (2006.01)

(52) U.S. Cl. ......... 379/112.06; 379/121.04; 379/114.03; 379/126

(58) Field of Classification Search ............. 379/112.07, 379/112.08, 114.01, 114.03, 114.04, 114.06, 379/114.28, 115.01, 116, 119, 121.05, 122, 379/126, 127.02, 127.04, 130, 133
See application file for complete search history.

(56) References Cited

U.S. PATENT DOCUMENTS

| | | | |
|---|---|---|---|
| 5,617,533 A | 4/1997 | Wu et al. | |
| 5,696,906 A * | 12/1997 | Peters et al. | 705/34 |
| 5,721,753 A | 2/1998 | Ehler et al. | |
| 5,729,588 A | 3/1998 | Chin et al. | |
| 6,144,726 A * | 11/2000 | Cross | 379/114.03 |
| 6,327,350 B1 | 12/2001 | Spangler et al. | |
| 6,337,901 B1 * | 1/2002 | Rome et al. | 379/112.01 |
| 6,643,625 B1 | 11/2003 | Acosta et al. | |
| 6,697,814 B1 | 2/2004 | Porter | |
| 6,731,730 B1 | 5/2004 | Zolotov | |
| 6,968,048 B2 | 11/2005 | Moisey et al. | |
| 7,020,254 B2 * | 3/2006 | Phillips | 379/114.04 |
| 7,209,964 B2 * | 4/2007 | Dugan et al. | 709/223 |
| 7,269,407 B2 * | 9/2007 | Carmon et al. | 455/406 |
| 7,356,516 B2 * | 4/2008 | Richey et al. | 705/80 |
| 2002/0082991 A1 | 6/2002 | Friedman et al. | |
| 2003/0036918 A1 | 2/2003 | Pintsov | |
| 2004/0067747 A1 | 4/2004 | Carpenter et al. | |
| 2004/0078330 A1 | 4/2004 | Henry | |
| 2004/0193516 A1 * | 9/2004 | Fine et al. | 705/32 |

OTHER PUBLICATIONS

Anonymous, A Government for the People for a Change, The California Performance Review Report, Aug. 3, 2004, INF14 Reduce Telecommunications Costs by Modifying Cost Monitoring and Auditing Processes, 1 page.

(Continued)

*Primary Examiner* — Binh Tieu (57) ABSTRACT

A computer-assisted system and method for auditing a communications bill wherein billing information is collected, reformatted and stored for use in a set of automated audits. The system and method for auditing a communications bill further collects data from other external systems such as a work order system, a trouble ticket system, an inventory system, an AMA/SMDR data source, an SS7 event record data source, or another source of call records or billing records. The data collected is used in a set of automated audits to determine if the communications bills contain errors. The system and method will further perform historical audits, and generate and manage the billing dispute process. The system and method will further provide audit reports and interface to an accounts payable system.

17 Claims, 7 Drawing Sheets

OTHER PUBLICATIONS

Anonymous, Telesoft Corp. Provides Invoice Processing Relief, Oct. 7, 2001, Press Release, Phoenix, AZ, 3 pages.

Anonymous, WinBill 32 Telecom Bill Tracking Software Solution, Nov. 4, 2004 product overview from Telemangement Technologies, Inc. web site, 2 pages.

Jainschigg, John. Bill Busters! Oct. 6, 2003 Communications Convergence Magazine, 4 pages.

Non-Final Office Action on U.S. Appl. No. 10/911,876, mailed Apr. 11, 2008.

Notice of Allowance on U.S. Appl. No. 11/911,876, mailed Aug. 26, 2008.

* cited by examiner

SYSTEM AND METHOD FOR AUDITING A COMMUNICATIONS BILL

CROSS-REFERENCE TO RELATED APPLICATIONS

This application is a continuation of application Ser. No. 10/911,876 filed on Aug. 5, 2004, which claims priority to provisional patent application No. 60/493,752, filed on Aug. 8, 2003.

FIELD OF THE INVENTION

The present invention relates to a system and method for analyzing a communication is bill, and more specifically, to a system and method for determining whether a communications bill contains errors that, if identified, would result in a refund and ongoing cost savings to the organization being billed by the communications service provider.

The current state of the Telecommunications business, combined with the complexities of voice and data services, has created an environment where a typical enterprise receives a multitude of complex bills, many of which contain errors. These errors are the result of the massive changes that the communications industry has undergone, and the increased complexity of services that are purchased by an enterprise. This problem is compounded by the need for many communications service providers to utilize incomprehensible and complicated pricing schemes as a form of marketing.

Enterprises are aware of these billing problems, and typically will manually review and validate their invoices on a periodic basis. Many large Enterprises perform audits of their telecom invoices manually or through consultants. These audits are typically performed quarterly or annually, and are very labor intensive. The audits are either performed in house or through a consulting contract that typically pays the consultant for successful disputes. The ability to perform a successful audit of an enterprise's communications bills is based on experience. The skilled auditors know the areas of a communications bill that are prone to errors, and further have specific knowledge of which communications vendors have certain billing problems. The skilled auditors primarily work for consulting firms that specialize in communications billing audits. The skilled auditors are typically not willing to share their knowledge and expertise with others due to the contingent nature of their business. Most auditors work oil a contingency fee basis where they are paid a percentage of the savings which they identify. A 30-50% contingency fee is very typical, and can result in a very large fee that the consultant receives. An automated software system and method would be counterintuitive to their business model; and as such, such a computer based system and method has not been proposed in the field.

The results of a typical audit reveal numerous overcharges and billing errors. Large enterprises spend millions of dollars per year on communications services. The ability to detect and correct billing errors has a direct impact on the organization's financial statements. For example, a mid sized enterprise that spends 3 Million dollars a year on communications services can typically find a 5-10% error rate on their bills. These errors, when identified, are returned to the organization for the period of time that they have been occurring. Often times finding these errors can have a significant positive impact on the organization's financial condition.

There is currently no automated way to detect these billing errors, track their recovery, and generate audits and reports to ensure that the bills that are paid are error free. These audits are performed manually, and are very labor intensive and costly to undertake. There are software products on the market today that are designed for Invoice Processing, but no software products that are designed specifically to automate the audit process. The current state of Invoice Processing software products are designed to read in an invoice electronically, and to process that invoice in a format that can be sent electronically to an accounts payable system. Such products include Telesoft's IPS (Invoice Processing Software) and TTI's WinBill. These products are designed for Invoice processing and bill tracking, and do not address the need to specifically audit and detect billing errors.

United States Patent Application Publication US 2004/0078330 entitled METHOD AND APPARATUS FOR AUDITING BILLING ACCOUNTS describes a method and apparatus for analyzing client bills from individual service providers such as attorneys to detect fraud by removing confidential information from the bill and validating the accuracy of the bill. The Method and Apparatus disclosed in patent application publication US2004/0078330 does not audit communications bills from communications providers such as carriers, and as such, does not contain the audits or data collection and processing techniques required to audit a communications bill and the complexities associated with communications billing.

United States Patent Application Publication US2003/0036918 A1 entitled SYSTEM AND METHOD FOR TRUSTED SELF-BILLING AND PAYMENT FOR UTILITIES INCLUDING AUDIT, VERIFICATION, RECONCILIATION AND DISPUTE RESOLUTION describes a system for validating service bills using two monitoring subsystems to independently measure the services received and assign a cost to those services using one monitoring subsystem, and using a second monitoring subsystem to collect the billing information from the service provider. The system and method described in this patent application publication is concerned with auditing and verifying usage only. It does not consider other information that may be contained in the bill such as recurring charges, taxes and credits, past due amounts, and the like. Further, the system described monitors usage on a per line basis, and contains a rating or costing algorithm to assign a cost. Such a "per line" monitoring device is impractical for large enterprises that may utilize thousands or tens of thousands of lines and circuits in a multiplexed T1 or T3 configuration. In addition, communications billing and rating are highly complex, and require a fairly high level of skill and cost to be performed properly. Such an undertaking would be cost prohibitive on a per line basis, as disclosed in said patent application publication. It is thus desirable to audit, verify and reconcile billing information on a larger scale such as encountered in a corporation or governmental organization without the need to physically monitor each phone line. It is further desirable to audit communications bills in areas other than usage by using information from other systems such as trouble ticket systems, work order systems, inventory systems. Signalling System Number 7 systems. Automatic Message Accounting Systems. Station Message Detail Recording systems, and the like.

SUMMARY OF THE INVENTION

According to one embodiment of the invention, a system and method for auditing a communications bill is provided. The system generally includes an audits and error detection module, an electronic billing data information retrieval unit, a manual entry billing data information retrieval unit, at least one billing data interface module, and an audit report generation module.

In another embodiment of the invention, the system for auditing a communications bill includes a call detail record data collection unit and further contains software to match the call detail records to the communications billing data to identify errors in the communications bill. Call detail records may include station message detail records, automatic message accounting records, internet protocol detail records, cellular call detail records, event records, and the like.

Another embodiment of the invention includes a Signaling System Number 7 (SS7) event message record data collections unit and further contains software to match the SS7 event message records to the communications billing data to identify errors in the communications bill.

Still another embodiment of the invention further contains a trouble ticket data information retrieval unit and software to audit the communications billing data against the information contained in the trouble ticket data to identify possible billing errors. One such example of a billing error that could be identified with the use of trouble ticket data is incorrect billing for a service outage when a credit for the outage should have been issued on the communications bill.

Still another embodiment of the invention further contains a work order data information retrieval unit and software to audit the communications billing data against the information contained in the work order data to identify possible billing errors. One such example of a billing error that could be identified with the use of work order data is continued billing for communications services after a work order was issued to disconnect the communications service. Another example of a billing error that would be identified by an embodiment of the invention is a premature start of billing prior to the completion of a work order to initiate service.

Yet another embodiment of the invention further contains an inventory data information retrieval unit and software to audit the communications billing data against the information contained in the inventory data to identify possible billing errors. One such example of a billing error that could be identified with the use of inventory data is a billing charge for an item or a service that does not belong to the billed party.

In some embodiments the results of the automated audits are used by a dispute processing module. The dispute processing module may include various components of the billing dispute process such as filing the billing dispute with the carrier or billing entity, tracking the billing dispute, short paying the bill, tracking associated late charges, validating that a credit has been issued for the dispute, maintaining records of the dispute dialogue, and the like.

In other embodiments the invention may include an accounts payable interface module that provides validated and audited billing data to an accounts payable system.

Other embodiments may include the ability to store and archive data both in raw form and in a form that is representative of the audit results provided by the audit and error detection module.

Some embodiments of the invention may allow the audit logic contained in the audit and error detection module to be modified by a user.

The invention may also be adapted for use through a web browser or an e-mail system.

In another aspect, the invention comprises a computer assisted method of auditing a communications bill comprising the steps of retrieving billing data information from at least one external input file wherein said at least one external input file contains communications billing information; formatting and storing said billing data information on a data storage device storing on a computer a set of selectable audit types; selecting one or more selected audit types by inputting appropriate selection data with an input device: performing selected audits using billing data information contained on a data storage device and automatically generating audit reports based on the selected audit types.

In some embodiments of the invention the steps may include collecting event records such as Station Message Detail Records (SMDR), Automatic Message Accounting (AMA) records. Internet Protocol Detail Records (IPDR), Call Detail Records (CDR) and the like, and comparing said event records to billing data information to identify billing errors. Other embodiments of the invention may include the steps of collecting Signaling System Number 7 (SS7) event message records and comparing said SS7 event message records to billing data information to identify billing errors.

Further embodiments of the invention may include the steps of collecting trouble ticket data and using said trouble ticket data to further identify billing errors. Still another embodiment of the invention may include the steps of collecting work order data and using said work order data to further identify billing errors. Yet another embodiment of the invention may include the steps of collecting inventory data and using said inventory data to further identify billing errors.

Some embodiments of the invention may include the steps of using the audit results to manage the overall dispute process, he dispute process may include steps such as filing the billing dispute with the carrier or billing entity, tracking the billing dispute, short paying the bill, tracking associated late charges, validating that a credit has been issued for the dispute, maintaining records of the dispute dialogue, and the like.

Yet other embodiments of the invention may include the steps of providing the processed billings information and the audit results to an accounts payable system.

Further embodiments of the invention may include the steps of accessing and using the invention through a web browser or an e-mail system.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

A method and apparatus for verifying the accuracy of a communications invoice is described. In the following description, for the purposes of explanation, numerous software functional blocks are described. The present invention may be practiced with all or only some of the functional blocks.

Figure 1:
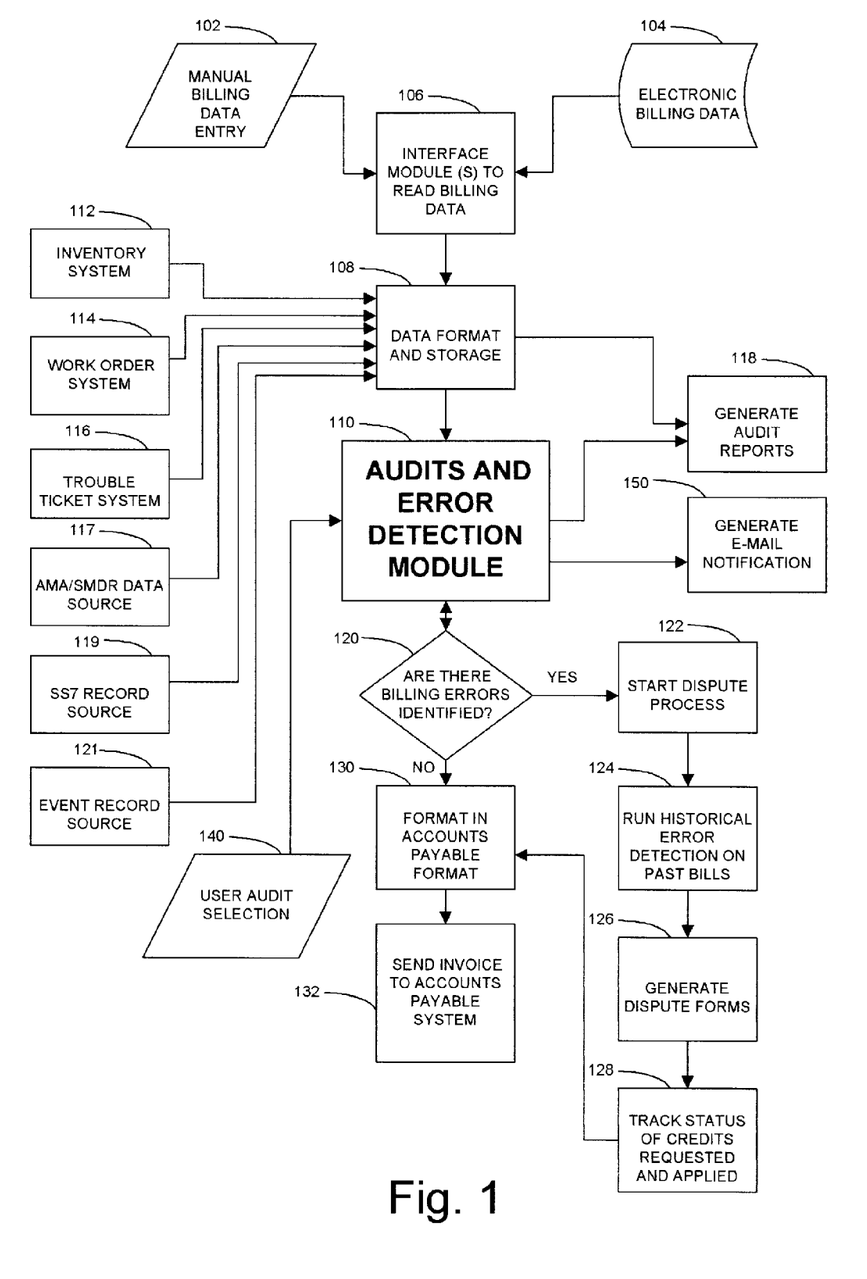
FIG. 1 is a flowchart of an auditing system and method according to one embodiment of the present invention.

Referring to FIG. 1, communications invoices are received either on paper and entered manually into a computer system in step 102, or electronically on either a media such as a Compact Disc (CD) or via an interface such as Electronic Data Interchange (EDI), in step 104. The billing data is typically in a format that is specific to the vendor providing the bill. For example, AT&T's electronic billing product is known as Billing Edge™, and is provided in a format that is unique to AT&T. Therefore, an interface module 106 is required to process the bill in it's unique format, and read the billing data into a standard format. Once the billing data is read into a standard format in step 106, the data is structured, indexed, formatted and stored in a data structure, such as a data storage and archiving module (DSAM), in step 108.

In performing a comprehensive set of automated audits in the software, information other than billing data is required. This information can be sent electronically to the data structure of step 108 from other systems. These systems can include an inventory system in step 112, a work order system in step 114, and a trouble ticket system in step 116. A source of Automated Message Accounting (AMA) data from a central office switch, Station Message Detail Recording (SMDR) data from a Private Branch Exchange (PBX) in step 117 is also transferred to said data structure in step 108. A source of Signaling System Number Seven (SS7) event records in step 119 may also provide data to the data structure of step 108. The signaling System Number Seven (SS7) event records may be pre-processed and converted to a call detail record, as described in U.S. Pat. No. 6,327,350 entitled "Methods and Systems For Collecting And Processing Signaling System 7 (SS7) Message Signal Units (MSUS), incorporated herein by reference in it's entirety.

Once the data structure in step 108 has been populated by way of steps 106, 112, 114, 116, 117 or 119, a series of automated audits and error detection routines are initiated in step 110. The audits are defined in this specification under the heading AUDIT SET, and are provided to illustrate by example one preferred embodiment of the invention, but are not intended to be limiting.

In step 110, the user may elect to run one, several or all of the audits that are contained in the software. The user may further elect to define a custom audit or modify audit parameters in step 140. If step 110 results in the detection of billing errors at step 120, the dispute process is started at step 122. This dispute process includes identifying the error, the amount of the error, unique identifying data from the invoice, and other attributes that will assist in recovering the amount in question. Once the dispute process is started in step 122, the same error detection routines that found the current billing error are applied to similar historical billing data in step 124 to determine how long this billing error has been occurring. This historical auditing data is used in the overall dispute process, and will be used to generate the total amount of the billing error that is automatically entered on a dispute form in step 126 that may be provided to the billing vendor. In step 128, the disputed amount is tracked, and compared to credits received on future bills. Additionally late payment charges and other charges and credits that may impact the disputed amount are tracked in step 128. Upon completion of step 128, the invoice is formatted to allow receipt by the accounts payable system in step 130. Once the formatting is completed in step 130, the invoice is sent to the accounts payable system for approval and payment.

Returning to step 120, if no billing errors are identified, the invoice is formatted to allow receipt by the accounts payable system in step 130. Once the formatting is completed in step 130, the invoice is sent to the accounts payable system for approval and payment in step 132

The invention also provides a set of reports in step 118 that are useful in managing billing information and tracking billing errors. These reports are generated from the data stored in the data storage and archiving module (DSAM) in step 108, or can be generated using data from the audits and error detection module in step 110. These reports follow standard accounting practices, and can be modified, created or changed by a user of the invention.

The invention may further generate an e-mail notification in step 150 if certain audit conditions are met. The e-mail may alert the designated recipient that certain audit thresholds have been exceeded, or may contain audit reports or hyperlinks to audit reports.

Figure 2:
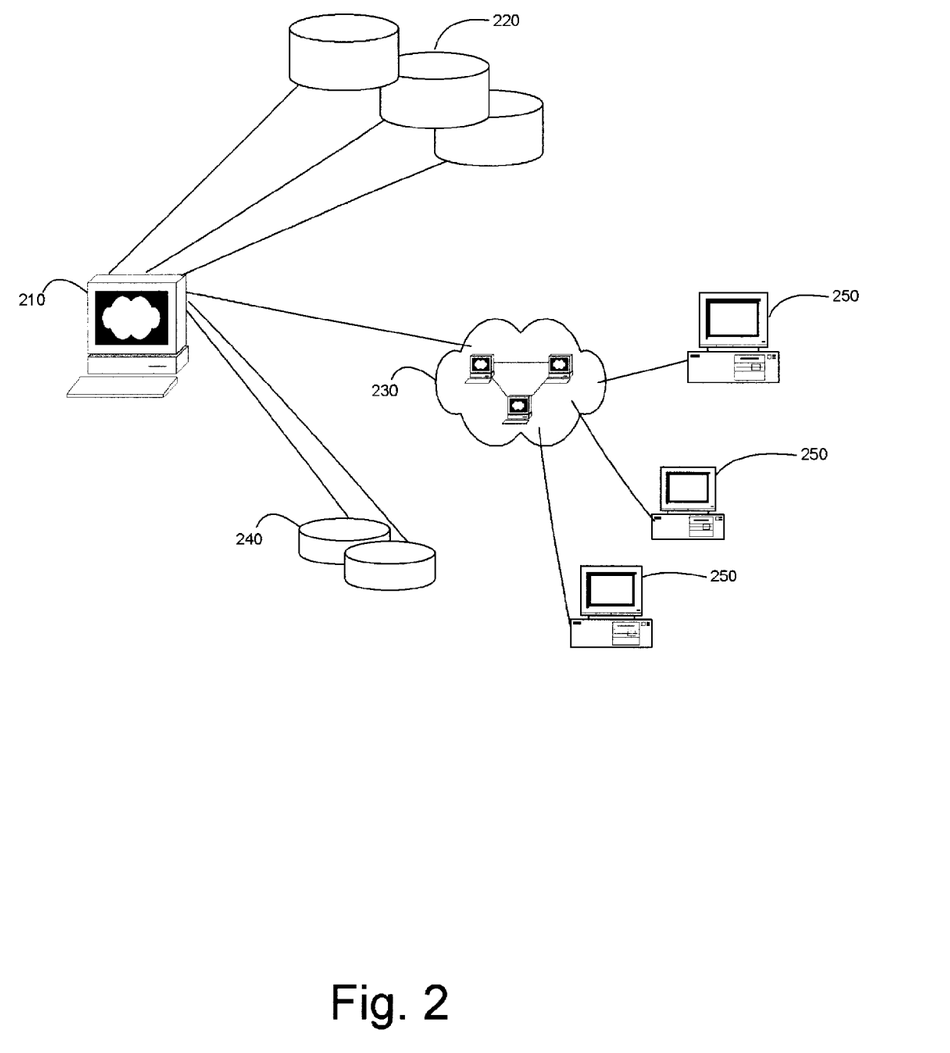
FIG. 2 is a block diagram of a preferred computer system of the invention.

Referring now to FIG. 2, a block diagram of a preferred computer system of the invention is shown. The various software modules, software components and software units, as will be further described using FIG. 3, are contained in computer system 210. The computer system 210 is connected to a network 230 to allow for the use of the invention through other computer systems 250. Said network 230 may be a Virtual private network, an Ethernet network, a wireless network, the internet, a corporate intranet, or the like. The computer system 210 will read data from external systems and files 220 that contain billing data, inventory system data, work order system data, trouble ticket system data. Automatic Message Accounting Data (AMA), Station Message Detail Recording Data (SMDR), Signaling System Number 7 Data, Event Record Data, cellular call detail records, or manual billing data. Said computer system 210 further provides outputs 240 in the form of audit reports, web based reports, dispute forms, accounts payable files and e-mail audit alerts.

Figure 3:
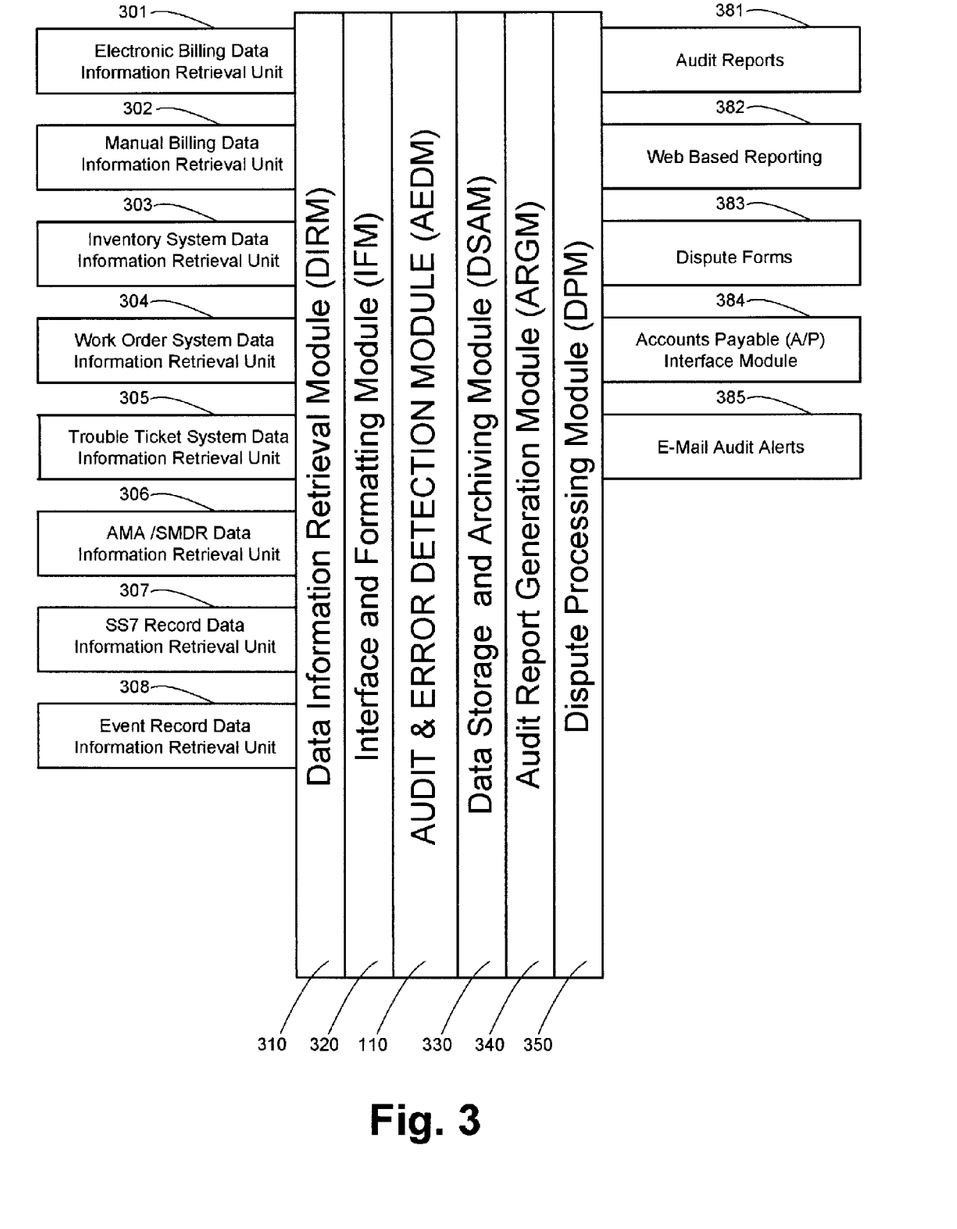
FIG. 3 is a functional block diagram of an auditing system according to one embodiment of the present invention.

Referring now to FIG. 3 a functional block diagram of an auditing system according to one embodiment of the present invention is shown. A data information retrieval module (DIRM) 310 is shown. This software component contains various data information retrieval units (DIRUs). A data information retrieval unit (DIRU) is a means for transferring data from an external source to the system for auditing a communications bill. The data information retrieval module provides access and file transfer capabilities for the various raw inputs required for the invention. The data information retrieval module 310 collects the raw data files that contain billing data, inventory data, work order data, trouble ticket data, automatic message accounting (AMA) data, station message detail recording (SMDR) data, Signaling System Number 7 (SS7) data and event record data that may include cellular call detail records. The data information retrieval module 310 is comprised of an electronic billing data information retrieval unit 301 that functions to collect raw electronic billing data files, a manual billing data information retrieval unit 302 that functions to collect raw manual billing data files, an inventory system data information retrieval unit 303 that functions to collect raw inventory system data files, a work order data information retrieval unit 304 that functions to collect raw work order system data files, a trouble ticket data information retrieval unit 305 that functions to collect raw trouble ticket system data files, an AMA/SMDR data information retrieval unit 306 that functions to collect raw automated message accounting and station message detail recording system data files, a Signaling System Number 7 (SS7) record data information retrieval unit 307 that functions to collect raw signaling system number 7 data files, and an event record data information retrieval unit 304 that functions to collect raw event record data files.

Operatively coupled to said Data Information Retrieval Module (DIRM) 310 is the interface and formatting module (IFM) 320 that serves to process and filter the raw data collected by each information retrieval unit using formatting and processing logic that is specific to each information retrieval unit. The interface and formatting module 320 provides data in a format that can be used to perform audits and error detection. Extraneous information that may be included in the raw data is stripped and only specified date range, account numbers, and billing identifiers are kept. The interface and formatting module 320 provides data that can be used by the audit and error detection module (AEDM) 110. Said audit and error detection module (AEDM) 110 contains the algorithms necessary to perform the audits. The audits contained in the audits and error detection module (AEDM) 110 include a series of general audits, a series of other charges and credits (OC&C) audits, a series of facilities audits, and a series of usage audits. The specific audits that are contained in each of these categories are defined below.

General Audits

The General Audits perform an audit of the existence of a charge on an invoice using the audit control thresholds set by the user.

Invoice Audits

The Invoice Audit verifies that the total amount that was billed for the invoice summary is equal to the detail records of the invoice.

Late Invoice Audits

The Late Invoice Audit will determine it a monthly invoice has not been received on time to avoid late payment charges. If a monthly invoice is not received within 'X' number of clays after the invoice date, the data storage and archiving module (DSAM) will create a Late Invoice record for that invoice and alert the user to the fact that the expected invoice has not arrived.

Late Payment Audit

The Late Payment Audit will automatically flag all Late Payment charges that are billed, giving the auditor the opportunity to verify the charges and either dispute or decline a dispute using the dispute processing module (DPM) 350.

OC&C Audit

The OC&C (Other Charges and Credits) Audit will automatically flag any charges that are billed as Other Charges and Credits, giving the auditor the opportunity to verify the charges and either dispute or decline a dispute using the dispute processing module (DPM) 350.

MRC Audit

The MRC (Monthly Recurring Charges) Audit automatically flags any charges billed as Monthly Recurring Charges, giving the auditor the opportunity to verify the charges and either dispute or decline a dispute using the dispute processing module (DPM) 350.

Taxes Audit

The Tax Audit automatically flags any charges that are billed taxes, giving the auditor the opportunity to either dispute or decline a dispute.

TABLE 1

| Taxes | |
| --- | --- |
| LOCAL | LONG DISTANCE |
| Federal Excise Tax | Federal Excise Tax |
| State and Local Taxes | State and Local Taxes |
| | Foreign State and Local Tax-Calling Card |

Surcharges Audit

The Surcharges Audit automatically flags any surcharges that are billed, giving the auditor the opportunity to either dispute or decline a dispute using the dispute processing module (DPM) 350.

TABLE 2

| Surcharges | |
| --- | --- |
| LOCAL | LONG DISTANCE |
| LNP Fcc | Federal, State and Local Surcharge |
| Network Access Charge | Foreign State and Local Surcharge-Calling Card |
| State and Local Surcharge | Federal Universal Service Fee |
| | Payphone Access Fee |

Balancing to Total Amount Due Audit

The Balancing to Total Amount Due Audit keeps track of all past balances whether they are payments or disputes outstanding.

General Ledger Code Assignment Audit

The General Ledger Code Assignment Audit verifies whether all charges on a bill have a GL assignment.

Facility Inventory Audits

The Facility Inventory Audits verify Universal Service Order Code (USOC)/feature consistency for each component of the charges for a given circuit location. The Facility Audits include Universal Service Order Code, Quantity, Effective Date, Disconnect Date. Rate, Facilities Billed vs. Facilities in inventory system.

Multiple Bills Audits

The Multiple Bills Audits verify only one invoice is paid using billing date and billing account number.

Valid Billing Account Record Audits

The Valid Billing Account Record Audits verify if the invoice received is a valid invoice for you. The Valid Billing Account Record Audits include billing account number, date, bill cycle date, bill period, and company name Inactive Account Audit The Inactive Account Audit verifies if the account is inactive or not correct.

SMDR Summary Audit

The SMDR Summary Audit verifies whether the SMDR data has been received prior to running the usage audits.

Trunk Charge Audit

The Trunk Charge audits validate the accuracy of trunk charges received on the invoice by comparing actual charges to expected charges.

OC&C DEBIT AUDITS

The OC&C Debit Audits verify the non-recurring charges and the fractional monthly recurring charges on an invoice.

OC&C NRC Circuit Existence Audits

The NRC Circuit Existence Audits validate that the circuit where the one-time charges are being assessed exists for the Billing Account Number (BAN). These audits compare the circuits being billed against the circuits listed in the Facility Circuit Inventory. Using the circuit ID, the audit detects any inconsistencies between the invoice and the inventory. Inconsistencies occur when a circuit is not listed in the Facility Circuit Inventory or when a circuit is listed as invalid. The OC&C NRC Circuit Existence Audits are performed on the effective date and the disconnect date.

OC&C NRC Service Establish Date Audit

The NRC SED (Service Established Date) audit compares the Work Order Completion Date with the Service Establish Date for the circuit to determine whether the charges are disputable. This audit calculates the difference between the Work Order Completion Date and the Service Establish Date to ensure that the inventory item was in service for the billing period being invoiced. If this audit identifies a discrepancy, it disputes the entire amount being billed. The information used for this audit is from the work order system.

OC&C NRC Rate Audits

The NRC Rate Audits verify the non-recurring charge by using known rates, calculating the appropriate non-recurring charge, and comparing it to the invoiced amount.

OC&C Fractional Circuit Existence Audits

The Fractional Circuit Existence Audits validate that the inventory item where the charges are being assessed exist for the Billing Account Number (BAN). These audits compare the circuits being billed against the circuits listed in the Facility Circuit Inventory. Using the circuit ID, the audit detects any inconsistencies between the invoice and the inventory. Inconsistencies occur when a circuit is not listed in the Facility Circuit Inventory or when a circuit is listed invalid. The OC&C Fractional Circuit Existence Audits are performed by effective date and disconnect date.

OC&C Fractional Service Establish Date Audit

The Fractional Service Establish Date (SED) Audit compares the Work Order Completion Date with the SED for the inventory item to determine whether the charges are disputable. This audit calculates the difference between the SO Completion Date and the SED to ensure that the inventory item was in service for the billing period being invoiced.

OC&C Fractional Feature Audits

The Fractional Feature Audits confirm that the inventory item where the charges are being assessed is valid for the circuit. These audits also check the quantity being billed by comparing the quantity billed to the actual quantity in the Facility Circuit Inventory for the selected BAN, circuit, location, and USOC. Inconsistencies occur when a feature is not listed in the facility Circuit Features Inventory, when feature values are different, or when a feature is listed as invalid. If a feature is not valid for the dates being billed, the system identifies the feature as invalid, then calculates and disputes the fractional amount being billed for the feature. The Facility Features Audit runs after the Facility Circuit existence Audit, so any disputed circuits will not be included in the facility Features Audit.

OC&C Fractional Rate Audits

The Fractional Rate Audits looks up the monthly recurring rate in the Facility Rate Maintenance tables and determine a per-day rate. The audits then multiply the per-day rate by the number of days to recalculate the actual fractional amount, and compares it with the invoiced amount. When the system identifies an overbilling discrepancy, it labels the record as a dispute.

Facility Audits

Facility Audits compare electronic or manual invoices against a circuit and Universal Service order code (USOC) inventory and against industry rate and tariff information. Business rules can be established by the user of the software to determine the threshold for flagging an item as disputed.

Facility Circuit Existence Audits

The Facility Circuit Existence Audits compare the circuits being billed against the circuits listed in the Facility Circuit Inventory. Using the circuit ID, this audit detects any inconsistencies between the invoice and the inventory. Inconsistencies occur when a circuit is not listed in the Facility Circuit Inventory or when a circuit is listed as invalid.

Facility Features Audits

The Facility Features Audits compare the features (USOCs) being billed against the features listed in the Facility Circuit Inventory for the same BAN, circuit, location, and USOC. The Facility Features Audits run after the Facility Circuit Existence Audit, so any disputed circuits will not be included in the facility Features Audits.

In addition, features that the Facility Features Audits identify as disputable and also have a rate discrepancy will appear in the Facility Audits results as Facility Rate Audit disputes. Disputes can only be counted under one category and the Facility Rate Audits are the last to be run, so items with both a feature and a rate dispute will appear in Facility Audit results as a Facility Rate Audit.

The Features Audits also check the quantity of features being billed by comparing the quantity billed to the actual quantity in the Facility Circuit Features Inventory table for the selected BAN, circuit, location, and USOC. Inconsistencies occur when a feature is not listed in the Facility Circuit Features Inventory or when a feature is listed as invalid. The feature must be valid for the dates being billed or the system identifies the feature as invalid and disputes the entire amount being billed for the feature.

Facility Rate Audits

The Facility Rate Audits compare the rates being billed against rates being stored. The Facility Rate Audits run after the Facility Circuit Existence Audits and Facility Features Audits. Any circuits that were disputed in the Facility Circuit Existence Audits will not be included in the Facility Rate Audits.

The Rate Audits deal only with discrepancies that are rate-based. This means that any other dispute characteristics (such as rate zone and jurisdiction) are dealt with in the Facility Features Audits.

In addition, features that the Facility Features Audits identify as disputable and also have a rate discrepancy will appear in the Facility Audit Results as Facility Rate Audit disputes. Disputes can only be counted under one category and the Facility Rate Audit is the last audit to be run, so items with both a feature and a rate dispute will appear in Facility Audit Results as a Facility Rate Audit.

SMDR Usage Audits

The Usage Audits verify Minutes of Use (MOU), Percentage of Interstate Usage (PIU), 800 Charges, and Directory Assistance (DA). The Usage Audits also include Rate Audits, which verify billed rates.

Minutes of Use Usage Audits

The Minutes of Use (MOU) Usage Audits verify the billed Minutes of Use (MOU) against the summarized SMDR data. MINUTES OF USE (MOU) Audits are performed for both current and backbilling cycles.

Total Long Distance Minutes of Use (MOU) Audits

The total long distance Minutes of Usage Audits verify the billed long distance MINUTES OF USE (MOU) against the long distance SMDR data. Audits are performed for both current and backbilling cycles.

Total Local Measured Service Audits

The total local measured service Audits verify the billed local calls against the local SMDR data. Audits are performed for both current and backbilling cycles.

Total International Minutes of Use (MOU) by Country Code Audits

The total International Minutes of Usage Audits verify the billed International Minutes of Use (MOU) against the International SMDR data. Audits are performed for both current and backbilling cycles.

800 Charge Audits

The 800 charge audits validate the charges applied for an 800 number by using rate and usage information stored in the data storage and archiving module (DSAM).

Directory Assistance Audits

The Directory Assistance Audits audit the billed quantity of Directory Assistance (DA) calls and attempts against the actual number of DA calls.

Rate Audits

The Rate Audits verify that billed rates for a given rate element do not exceed the tariffed or user-supplied rates. Usage rates are validated for each rate variable against the tariff or contract rates. The data storage and archiving module (DSAM) can be populated manually for contract and/or interconnection agreement rates or by using a tariff rate vendor.

AMA Usage Audits

The Usage Audits verify Minutes of Use (MOU). Percentage of Interstate Usage (PIU), 800 Charges, and Directory Assistance (DA). The Usage Audits also include Rate Audits, which verify billed rates.

Minutes of Use Usage Audits

The Minutes of Use (MOU) Usage Audits verify the billed Minutes of Use (MOU) against the summarized AMA data. Minutes of Use (MOU) Audits are performed for both current and backbilling cycles.

Total Long Distance Minutes of Use (MOU) Audits

The total long distance Minutes of Usage Audits verify the billed long distance Minutes of Use (MOU) against the long distance AMA data. Audits are performed for both current and backbilling cycles.

Total Local Measured Service Audits

The total local measured service Audits verify the billed local calls against the local AMA data. Audits are performed for both current and backbilling cycles.

Total International Minutes of use (MOU) by Country Code Audits

The total International Minutes of Usage Audits verify the billed International Minutes of Use (MOU) against the International AMA data. Audits are performed for both current and backbilling cycles.

800 Charge Audits

The 800 charge audits validate the charges applied for an 800 number by using rate and usage information stored in the data storage and archiving module (DSAM).

Directory Assistance Audits

The Directory Assistance Audits audit the billed quantity of Directory Assistance (DA) calls and attempts against the actual number of DA calls.

Rate Audits

The Rate Audits verify that billed rates for a given rate element do not exceed the tariffed or user-supplied rates. Usage rates are validated for each rate variable against the tariff or contract rates. The data storage and archiving module (DSAM) can be populated manually for contract and/or interconnection agreement rates or by using a tariff rate vendor.

Event Record Usage Audits

The Usage Audits verify Minutes of Use (MOU), Percentage of Interstate Usage (PIU), 800 Charges, and Directory Assistance (DA). The Usage Audits also include Rate Audits, which verify billed rates.

Minutes of Use Usage Audits

The Minutes of Use (MOU) Usage Audits verify the billed Minutes of Use (MOU) against the summarized event record data. Minutes of Use (MOU) Audits are performed for both current and backbilling cycles.

Total long distance Minutes of Use (MOU) Audits

The total long distance Minutes of Usage Audits verify the billed long distance MINUTES OF USE (MOU) against the long distance event record data. Audits are performed for both current and backbilling cycles.

Total Local Measured Service Audits

The total local measured service Audits verify the billed local calls against the local event record data. Audits are performed for both current and backbilling cycles.

Total International Minutes of Use (MOU) by Country Code Audits

The total International Minutes of Usage Audits verify the billed International Minutes of Use (MOU) against the International event record data. Audits are performed for both current and backbilling cycles.

800 Charge Audits

The 800 charge audits validate the charges applied for an 800 number by using rate and usage information stored in the data storage and archiving module (DSAM).

Directory Assistance Audits

The Directory Assistance Audits audit the billed quantity of Directory Assistance (DA) calls and attempts against the actual number of DA calls.

Rate Audits

The Rate Audits verify that billed rates for a given rate element do not exceed the tariffed or user-supplied rates. Usage rates are validated for each rate variable against the tariff or contract rates. The data storage and archiving module (DSAM) can be populated manually for contract and/or interconnection agreement rates or by using a tariff rate vendor.

SS7 Usage Audits

The Usage Audits verify Minutes of Use (MOU), Percentage of Interstate Usage (PIU), 800 Charges, and Directory Assistance (DA). The Usage Audits also include Rate Audits, which verify billed rates.

Minutes of Use Usage Audits

The Minutes of Use (MOU) Usage Audits verify the billed Minutes of Use (MOU) against the summarized SS7 data. Minutes of Use (MOU) audits are performed for both current and backbilling cycles.

Total Long Distance Minutes of Use (MOU) Audits

The total long distance Minutes of Usage Audits verify the billed long distance Minutes of Use (MOU) against the long distance SS7 data. Audits are performed for both current and backbilling cycles.

Total Local Measured Service Audits

The total local measured service Audits verify the billed local calls against the local SS7 data. Audits are performed for both current and backbilling cycles.

Total International Minutes of Use (MOU) by Country Code Audits

The total International Minutes of Usage Audits verify the billed International Minutes of Use (MOU) against the International SS7 data. Audits are performed for both current and backbilling cycles.

800 Charge Audits

The 800 charge audits validate the charges applied for an 800 number by using rate and usage information stored in the data storage and archiving module (DSAM).

Directory Assistance Audits

The Directory Assistance Audits audit the billed quantity of Directory Assistance (DA) calls and attempts against the actual number of DA calls.

Rate Audits

The Rate Audits verify that billed rates for a given rate element do not exceed the tariffed or user-supplied rates. Usage rates are validated for each rate variable against the tariff or contract rates. The data storage and archiving module (DSAM) can be populated manually for contract and/or interconnection agreement rates or by using a tariff rate vendor.

Again referring to FIG. 3, the data storage and archiving module (DSAM) 330 may utilize a database, an alternate data structure, or a series of files to store the raw data collected by the information retrieval units of the data information retrieval module (DIRM) 310, the data that has been processed by the interface and formatting module (IFM) 320, and the audit results from the audit and error detection module (AEDM) 110. A relational database is one preferred architecture for said data storage and archiving module (DSAM) 330. Examples of relational databases include Oracle™, Sybase™, and Microsoft Access™. The audit report generation module (ARGM) 340 accesses data contained in the data storage and archiving module (DSAM) 330 for formatting and compilation into a set of audit reports 381. The audit report generation module (ARGM) 340 will generate reports in printable or electronic format. The audit reports 381 may be modified by a user. An electronic audit report may be further customized using an ad hoc report writer such as Crystal Reports™ by Crystal Decisions. Inc. The audit reports 381 may further be provided using web based reporting 382 such that the reports can be accessed using hyperlinks from a web site. Electronic format audit reports may be stored in the data storage and archiving module (DSAM) 330 for future use.

The dispute processing module (DPM) 350 contains the logic necessary to execute and track the dispute process, as defined in FIG. 1, steps 122, 124, 126, 128, 130 and 132. The dispute processing module (DPM) 350 also generates dispute forms 383 to be used in the dispute process.

Referring again to FIG. 3, an accounts payable interface module 384 receives audited billing information from the audit and error detection module (AEDM) 110 and formats the billing information so that it can be read and processed by an accounts payable system. Examples of accounts payable systems include SAP™, PeopleSoft™ and Oracle Financials™. The accounts payable interface module 384 may further receive information from the dispute processing module (DPM) 350 indicative of any disputes, credits, debits or short pays that have occurred.

FIG. 3 also illustrates e-mail alerts 385. The e-mail alerts 385 automatically sends e-mail to designated e-mail addresses that contains audit information or hyper inks to said audit information.

Figure 4:
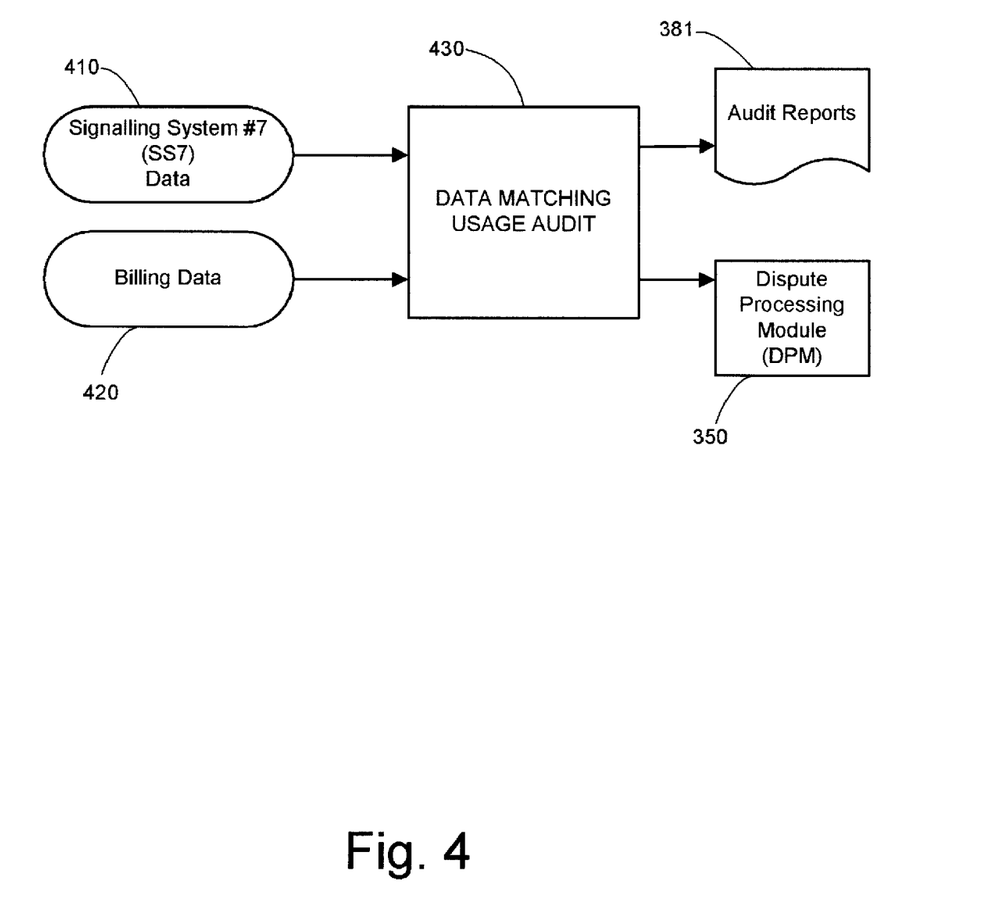
FIG. 4 is a functional block diagram of the Signaling System Number 7 (SS7) data matching usage audit according to one embodiment of the present invention.

Referring now to FIG. 4, a functional block diagram of the Signaling System Number 7 (SS7) data matching usage audit is shown. Signaling System Number 7 (SS7) data 410, having been collected by the SS7 record data information retrieval unit 307 (FIG. 3) in the data information retrieval module 310 (FIG. 3), and processed through the interlace and formatting module (IFM) 320 (FIG. 3), is compared to billing data 420 that has been collected by the electronic billing data retrieval unit 301 (FIG. 3) in the data information retrieval module 3110 (FIG. 3), and processed through the interface and for-matting module (IFM) 320 (FIG. 3). The signaling System Number Seven (SS7) event records may be pre-processed and converted to a call detail record, as described in U.S. Pat. No. 6,327,350 entitled "Methods and Systems for Collecting and Processing Signaling System 7 (SS7) Message Signal Units (MSUS), incorporated herein by reference in it's entirety.

The comparison of Signaling System Number 7 (SS7) data 410 and Billing Data 420 is performed using the data matching usage audit 430. The Usage audit compares the signaling system number 7 (SS7) data 410 to the billing data 420 to look for errors in total billed minutes Of use, total long distance minutes of use, total local measure service, total international minutes of use, total 800 charges, total directory assistance charges, and rates. Upon completion of the data matching usage audit 430, audit reports 381 are generated that contain the specific errors in each of the usage audit categories (total billed minutes of use, total long distance minutes of use, total local measure service, total international minutes of use, total 800 charges, total directory assistance charges, rates and the like). The errors that are identified during the data matching usage audit 430 may further be sent to the dispute processing module (DPM) 350 for dispute actions such as notification, short pay, and the like.

Figure 5:
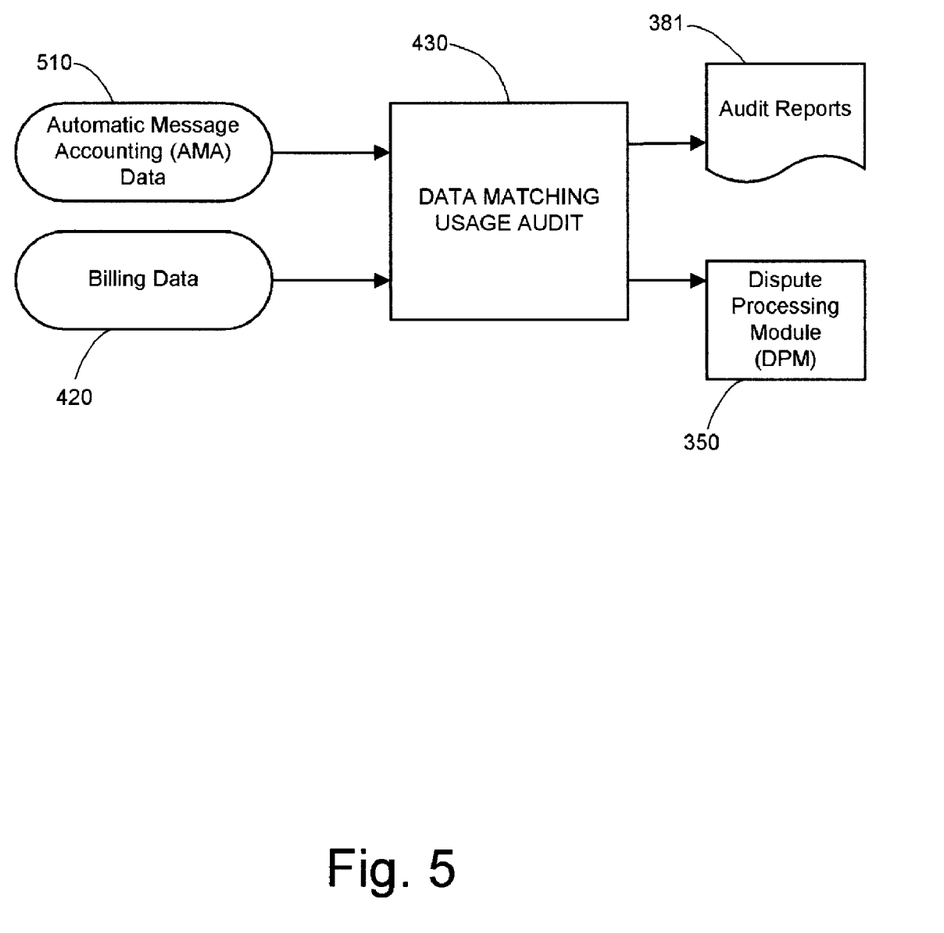
FIG. 5 is a functional block diagram of the Automatic Message Accounting (AMA) data matching usage audit according to one embodiment of the present invention.

Referring now to FIG. 5, a functional block diagram of the Automatic Message Accounting (AMA) data matching usage audit is shown. Automatic Message Accounting (AMA) data 510, having been collected by the AMA/SMDR record data information retrieval unit 306 (FIG. 3) in the data information retrieval module 310 (FIG. 3), and processed through the interface and formatting module (IFM) 320 (FIG. 3), is compared to billing data 420 that has been collected by the electronic billing data retrieval unit 301 (FIG. 3) in the data information retrieval module 310 (FIG. 3), and processed through the interface and formatting module (IFM) 320 (FIG. 3). This comparison of Automatic Message Accounting (AMA) Data 510 and Billing Data 420 is performed using the data matching usage audit 430. The data matching usage audit 430 compares the Automatic Message Accounting (AMA) data 510 to the billing data 420 to look for errors in total billed minutes of use, total long distance minutes of use, total local measure service, total international minutes of use, total 800 charges, total directory assistance charges, and rates. Upon completion of the data matching usage audit 430, audit reports 381 are generated that contain the specific errors in each of the usage audit categories (total billed minutes of use, total long distance minutes of use, total local measure service, total international minutes of use, total 800 charges, total directory assistance charges, and rates). The errors that are identified during the data matching usage audit 430 may further be sent to the dispute processing module (DPM) 350 for dispute actions such as notification, short pay, and the like.

Figure 6:
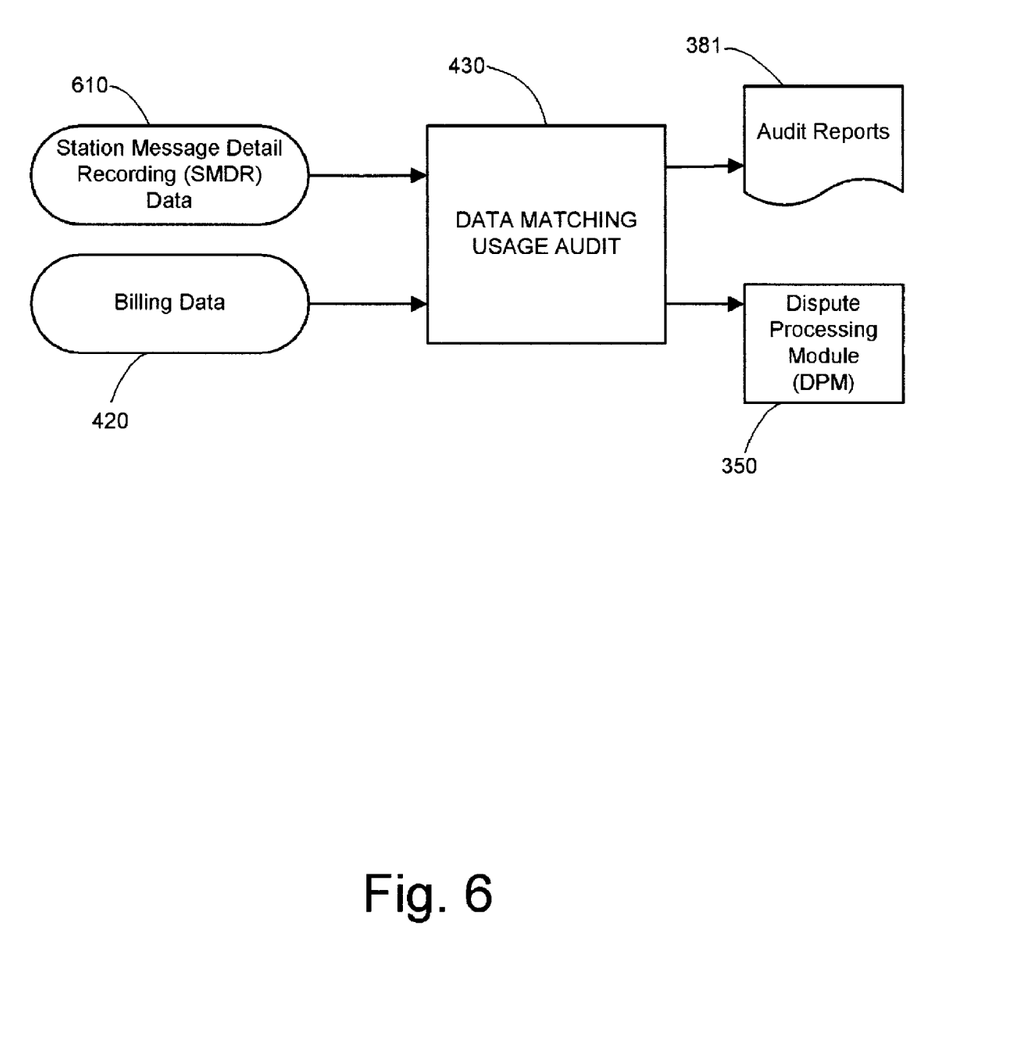
FIG. 6 is a functional block diagram of the Station Message Detail Recording (SMDR) data matching usage audit according to one embodiment of the present invention.

Referring now to FIG. 6, a functional block diagram of the Station Message Detail Recording (SMDR) data matching usage audit is shown. Station Message Detail Recording (SMDR) data 610, having been collected by the AMA/SMDR record data information retrieval unit 306 (FIG. 3) in the data information retrieval module 310 (FIG. 3), and processed through the interface and formatting module (IFM) 320 (FIG. 3), is compared to billing data 420 that has been collected by the electronic billing data retrieval unit 301 (FIG. 3) in the data information retrieval module 310 (FIG. 3), and processed through the interface and formatting module (IFM) 320 (FIG. 3). This comparison of Station Message Detail Recording (SMDR) Data 610 and Billing Data 420 is performed using the data matching usage audit 430. The data matching usage audit 430 compares the Station Message Detail Recording (SMDR) data 610 to the billing data 420 to look for errors in total billed minutes of use, total long distance minutes of use, total local measure service, total international minutes of use, total 800 charges, total directors assistance charges, and rates. Upon completion of the data matching usage audit 430, audit reports 381 are generated that contain the specific errors in each of the usage audit categories (total billed minutes of use, total long distance minutes of use, total local measure service, total international minutes of use, total 800 charges, total directory assistance charges, and rates). The errors that are identified during the data matching usage audit 430 may further be sent to the dispute processing module (DPM) 350 for dispute actions such as notification, short pay, and the like.

Figure 7:
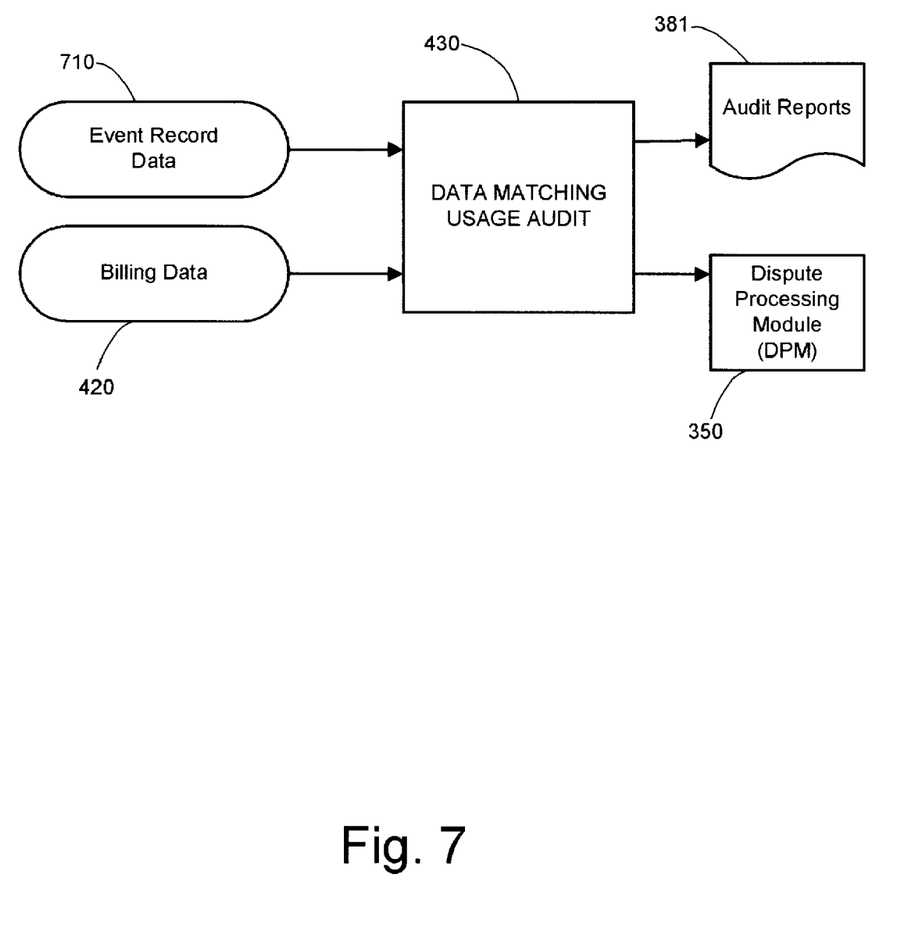
FIG. 7 is a functional block diagram of the Event Record data matching usage audit according to one embodiment of the present invention.

Referring now to FIG. 7, a functional block diagram of the Event Record data matching usage audit is shown. Event Record data 710 includes any billing related record such as a cellular call detail record, an internet protocol call detail record, a packet call detail record, a network call detail record, and the like. Event Record data 710, having been collected by the event record data information retrieval unit 308 (FIG. 3) in the data information retrieval module 310 (FIG. 3), and processed through the interface and formatting module (IFM) 320 (FIG. 3), is compared to billing data 420 that has been collected by the electronic billing data retrieval unit 301 (FIG. 3) in the data information retrieval module 310 (FIG. 3), and processed through the interface and formatting module (IFM) 320 (FIG. 3). This comparison of Event Record Data 710 and Billing Data 420 is performed using the data matching usage audit 430. The data matching usage audit 430 compares the Event Record data 710 to the billing data 420 to look for errors in total billed minutes of use, total long distance minutes of use, total local measure service, total international minutes of use, total 800 charges, total directory assistance charges, and rates. Upon completion of the data matching usage audit 430, audit reports 381 are generated that contain the specific errors in each of the usage audit categories (total billed minutes of use, total long distance minutes of use, total local measure service, total international minutes of use, total 800 charges, total directory assistance charges, and rates). The errors that are identified during the data matching usage audit 430 may further be sent to the dispute processing module (DPM) 350 for dispute actions such as notification, short pay, and the like.

I claim:

1. A system comprising:
   an interface module configured to receive billing data information from at least one vendor in a vendor specific format and to convert the billing data information into standard format billing data information;
   a data structure configured to store:
      the standard format billing data information;
      non-billing data including work order data wherein the work order data is based on a work order related to a communications service; and
   at least one processor operatively coupled to the data structure and configured to:
      analyze the standard format billing data information and the non-billing data to determine that a communications bill includes an error;
      analyze previous billing data information in the case that the standard format billing data information includes the error;
      determine a total billing error amount based on the error in the communications bill and the previous billing data information; and
      generate a dispute form including the total billing error amount.

2. The system of claim 1, wherein the data structure is configured to store Signaling System #7 (SS7) record data and the processor is further configured to:
   perform a plurality of audits on the billing data to determine if at least one of a plurality of predetermined conditions exist in the billing data wherein at least one audit compares the SS7 record data with the standard format billing data information to determine if there is an error in at least one of minutes used and charges billed; and
   generate an audit report based on the comparison of the SS7 record data and the standard format billing data information.

3. The system of claim 1, wherein the standard format billing data information comprises text messaging data.

4. The system of claim 1, wherein the data structure is further configured to store trouble ticket data, and wherein the processor is further configured to match the trouble ticket data to the standard format billing data information.

5. The system of claim 1, wherein the processor is further configured to match the work order data to the standard format billing data information.

6. The system of claim 1, wherein the processor is further configured to match inventory data to the standard format billing data information.

7. The system of claim 1, wherein the system further comprises an accounts payable interface module.

8. The system of claim 1, wherein audit logic used by the processor to determine that the communications bill includes the error can be modified by a user.

9. The system of claim 1, wherein the processor is further configured to automatically e-mail an audit report to one or more designated e-mail addresses, wherein the audit report is indicative of the error.

10. The system of claim 1, wherein the interface module comprises an interface that is configured to be used through a web browser.

11. A method comprising:
   receiving, at a computing device, billing data information in a vendor specific format from at least one vendor and non-billing data including work order data, wherein the work order data is based on a work order related to a communications service;
   converting the billing data information into standard format billing data information;
   analyzing the standard format billing data information and the non-billing data to determine that a communications bill includes an error;
   analyzing previous billing data information in the case that the standard format billing data information includes the error;
   determining a total billing error amount based on the error in the standard format billing data information and the previous billing data information using a processor; and
   generating a dispute form including the total billing error amount.

12. The method of claim 11, further comprising:
   receiving event records;
   receiving a selection of an algorithm for comparing the event records to the standard format billing data information; and
   comparing, with the selected algorithm, the event records to the standard format billing data information to generate an audit report.

13. The method of claim 11, wherein the standard format billing data information comprises text messaging data.

14. The method of claim 11, further comprising initiating a dispute process based at least in part on the audit report, wherein initiating the dispute process comprises notifying a vendor of the error and tracking credits received from the vendor for the error.

15. The method of claim 11, wherein the non-billing data includes Signaling System #7 (SS7) record data and the processor is further configured to:
   perform a plurality of audits on the billing data to determine if at least one of a plurality of predetermined conditions exist in the billing data wherein at least one audit compares the SS7 record data with the standard format billing data information to determine if there is an error in at least one of minutes used and charges billed; and
   generate an audit report based on the comparison of the SS7 record data and the standard format billing data information.

16. A tangible computer-readable medium having instructions stored thereon, the instructions comprising:

instructions to receive billing data information from at least one vendor and work order data, wherein the work order data is based on a work order related to a communications service, and wherein the billing data information is in a vendor specific format;

instructions to convert the billing data information into standard format billing data information;

instructions to analyze the standard format billing data information and the work order data to determine that a communications bill includes an error;

instructions to analyze previous billing data information in the case that the standard format billing data information includes an error;

instructions to determine a total billing error amount based on the error in the standard format billing data information and the previous billing data information using a processor; and instructions to generate a dispute form including the total billing error amount.

17. The tangible computer-readable medium of claim 16, further comprising instructions to e-mail the dispute form to one or more designated e-mail addresses.

* * * * *

UNITED STATES PATENT AND TRADEMARK OFFICE
CERTIFICATE OF CORRECTION

| | |
|---|---|
| PATENT NO. | : 8,165,276 B2 |
| APPLICATION NO. | : 12/254004 |
| DATED | : April 24, 2012 |
| INVENTOR(S) | : Gunderman, Jr. |

It is certified that error appears in the above-identified patent and that said Letters Patent is hereby corrected as shown below:

On Page 2, in Field (56), under "OTHER PUBLICATIONS", in Column 1, Line 4, delete "Telemangement" and insert -- Telemanagement --, therefor.

In Column 1, Line 15, delete "communication is" and insert -- communications --, therefor.

In Column 1, Line 47, delete "oil" and insert -- on --, therefor.

In Column 2, Line 58, delete "inventory systems." and insert -- inventory systems, --, therefor.

In Column 2, Line 58, delete "Signalling" and insert -- Signaling --, therefor.

In Column 2, Line 59, delete "7 systems." and insert -- 7 systems, --, therefor.

In Column 2, Line 59, delete "Accounting systems." and insert -- Accounting systems, --, therefor.

In Column 3, Line 60, delete "inodified" and insert -- modified --, therefor.

In Column 4, Line 2, delete "device" and insert -- device; --, therefor.

In Column 4, Line 4, delete "device:" and insert -- device; --, therefor.

In Column 4, Line 6, delete "device" and insert -- device; --, therefor.

In Column 4, Line 11, delete "(AMA) records." and insert -- (AMA) records, --, therefor.

In Column 4, Line 27, delete "he" and insert -- the --, therefor.

In Column 4, Line 33, delete "billings" and insert -- billing --, therefor.

Signed and Sealed this
Twenty-third Day of October, 2012

David J. Kappos
*Director of the United States Patent and Trademark Office*

CERTIFICATE OF CORRECTION (continued)
U.S. Pat. No. 8,165,276 B2

In Column 4, Line 63, delete "DESCRIPTION" and insert -- DETAILED DESCRIPTION --, therefor.

In Column 5, Line 35, delete "(MSUS)," and insert -- (MSUs), --, therefor.

In Column 5, Line 61, delete "Additionally" and insert -- Additionally, --, therefor.

In Column 6, Line 5, delete "132" and insert -- 132. --, therefor.

In Column 6, Line 30, delete "system data." and insert -- system data, --, therefor.

In Column 7, Line 31, delete "it" and insert -- if --, therefor.

In Column 7, Line 34, delete "clays" and insert -- days --, therefor.

In Column 8, Line 13, delete "LNP Fcc" and insert -- LNP Fee --, therefor.

In Column 8, Line 30, delete "Discount Date." and insert -- Discount Date, --, therefor.

In Column 8, Line 39, delete "name" and insert -- name. --, therefor.

In Column 13, Line 17, delete "Decisions." and insert -- Decisions, --, therefor.

In Column 13, Line 39, delete "hyper inks" and insert -- hyperlinks --, therefor.

In Column 13, Line 46, delete "interlace" and insert -- interface --, therefor.

In Column 13, Line 50, delete "3110" and insert -- 310 --, therefor.

In Column 13, Line 56, delete "(MSUS)," and insert -- (MSUs), --, therefor.

In Column 13, Line 61, delete "Of" and insert -- of --, therefor.

In Column 14, Line 53, delete "directors" and insert -- directory --, therefor.